(12) United States Patent
Saint-Dizier

(10) Patent No.: US 9,789,995 B2
(45) Date of Patent: Oct. 17, 2017

(54) METHOD FOR MANUFACTURING AN AMMONIA STORAGE CARTRIDGE, IN PARTICULAR FOR A MOTOR VEHICLE EXHAUST SYSTEM

(75) Inventor: Serge Saint-Dizier, Valentigney (FR)

(73) Assignee: Faurecia Systemes D'Echappement, Nanterre (FR)

( * ) Notice: Subject to any disclaimer, the term of this patent is extended or adjusted under 35 U.S.C. 154(b) by 715 days.

(21) Appl. No.: 13/807,784

(22) PCT Filed: Jul. 1, 2011

(86) PCT No.: PCT/FR2011/051553
§ 371 (c)(1),
(2), (4) Date: Jun. 5, 2013

(87) PCT Pub. No.: WO2012/001331
PCT Pub. Date: Jan. 5, 2012

(65) Prior Publication Data
US 2014/0311939 A1     Oct. 23, 2014

(30) Foreign Application Priority Data

Jul. 1, 2010 (FR) ..................... 10 55303

(51) Int. Cl.
| C01C 1/02 | (2006.01) |
| B65D 6/02 | (2006.01) |
| C01C 1/00 | (2006.01) |
| C01F 11/24 | (2006.01) |
| B01J 20/04 | (2006.01) |

(52) U.S. Cl.
CPC ............. *B65D 7/02* (2013.01); *B01J 20/046* (2013.01); *C01C 1/006* (2013.01); *C01F 11/24* (2013.01); *B01D 2251/2062* (2013.01); *B01D 2257/404* (2013.01); *B01D 2258/012* (2013.01); *F01N 2450/30* (2013.01); *F01N 2610/02* (2013.01); *Y10T 29/302* (2015.01); *Y10T 29/49826* (2015.01)

(58) Field of Classification Search
CPC ............. F01N 2610/02; F01N 2450/30; Y10T 29/49826; Y10T 29/53526; Y10T 29/49345; B01D 2251/2062; B29C 43/00
USPC ..................... 156/233; 206/524; 29/428, 17.3
See application file for complete search history.

(56) References Cited

U.S. PATENT DOCUMENTS

| 5,084,120 A * | 1/1992 | Fischer ................. B64C 1/1461 156/233 |
| 2013/0230443 A1* | 9/2013 | Christensen ........... B01D 53/90 423/239.1 |

FOREIGN PATENT DOCUMENTS

| WO | 2006081824 A2 | 8/2006 |
| WO | WO 2011123309 | * 10/2011 |

OTHER PUBLICATIONS

FR Search Report dated Oct. 25, 2011.

* cited by examiner

*Primary Examiner* — Anthony Stashick
*Assistant Examiner* — Raven Collins
(74) *Attorney, Agent, or Firm* — Carlson, Gaskey & Olds, PC

(57) ABSTRACT

A method for manufacturing an ammonia storage cartridge includes a step for supplying a material by ammonia absorption or adsorption by absorbent salts, a step for producing an intermediate element, including compacting the material to form the intermediate element, a step for stacking at least two intermediate elements in a shell of the cartridge, and a step for compressing the stack of intermediate elements in the shell.

18 Claims, 6 Drawing Sheets

METHOD FOR MANUFACTURING AN AMMONIA STORAGE CARTRIDGE, IN PARTICULAR FOR A MOTOR VEHICLE EXHAUST SYSTEM

CROSS-REFERENCE TO RELATED APPLICATIONS

This is the U.S. national phase of PCT/FR2011/051553 filed on Jul. 1, 2011, claiming priority to FR 10 55303, filed Jul. 1, 2010.

TECHNICAL FIELD

The present invention relates to a method for manufacturing an ammonia storage cartridge. Such a cartridge is in particular designed to equip a motor vehicle exhaust system.

BACKGROUND OF THE INVENTION

In order to reduce nitrogen oxide (NO) and nitrogen dioxide ($NO_2$) emissions in exhaust gases, in particular on diesel engines, ammonia ($NH_3$) is generally injected into the gas exhaust system. The ammonia then reacts with the nitrogen oxide (NO) and nitrogen dioxide ($NO_2$) to produce nitrogen and water.

For safety reasons, the ammonia is not stored in its raw form, but in the form of a material generally made by ammonia absorption or adsorption by metallo-chlorous salts. This material thus obtained is then stored in a cartridge.

During use, this cartridge is heated such that the ammonia stored in the cartridge is desorbed, to be injected in gaseous form into the gas exhaust system.

A method is already known from the state of the art, in particular from WO 2006/081824, for manufacturing an ammonia storage cartridge, in particular for a motor vehicle exhaust system, including: a step for providing a material capable of absorbing or adsorbing, and desorbing, ammonia, said material being at least partially saturated with ammonia, a step for producing an intermediate element, including compacting said material so as to form the intermediate element, and a step for stacking at least two intermediate elements in a shell of the cartridge. The effectiveness of the cartridge manufactured using such a method is not optimal, as play may remain between the intermediate elements, and between the intermediate elements and the shell.

This drawback will be resolved by providing a method for manufacturing an ammonia storage cartridge with optimized effectiveness, in particular relative to heat transfers in the cartridge.

SUMMARY OF THE INVENTION

A method for manufacturing an ammonia storage cartridge, in particular for a motor vehicle exhaust system, includes: a step for providing a material capable of absorbing or adsorbing ammonia, at least partially saturated with ammonia, a step for producing an intermediate element, including compacting the material to form the intermediate element, a step for stacking at least two intermediate elements in a shell of the cartridge and including a step for applying a pressure, in the stacking direction, on the stack of the intermediate elements in the shell.

According to a first example embodiment, the step for applying a pressure is a step of compression, not substantially altering the density of the material.

In fact, a distinction is made between a compacting step and a compression step in that a compacting step alters the density of the compacted material, whereas a compression step does not substantially alter the density of the material.

Thus, the compression step is designed to apply the intermediate elements on one another, such that the intermediate elements come into close contact with one another, without play.

The method according to this first embodiment only includes a compacting step, such that it makes it possible to control the density of the material easily.

This axial compression of the intermediate elements in particular results in radially extending the intermediate elements, such that the contact between the intermediate elements and the inner wall of the shell is ensured. In this way, one ensures optimal contact between the stacked intermediate elements, and between the intermediate elements and the inner wall of the shell. This optimal contact makes it possible to ensure good heat diffusion in the cartridge.

It will be noted that the deformation of these intermediate elements is relatively low during this compression, which limits the heat emitted during the compression. The desorption of ammonia is therefore limited during the compression.

Furthermore, the compression causes very little strain in the shell, which makes it possible to avoid deformation and wear of the shell during the compression.

According to a second embodiment of the invention, the step for applying a pressure is a second step of compacting, altering the density of the material compacted.

The method according to the invention may include one or more of the following features, considered alone or according to all technically possible combinations: the compacting of the material is done at a first pressure, and the compression of the intermediate elements is done at a second pressure, lower than the first pressure, during the step for producing the intermediate element, the material is covered, preferably after compacting, with at least one thermally conductive foil, for example an aluminum foil, the step for producing an intermediate element is carried out such that each intermediate element has a lower surface and an upper surface that are parallel to each other, each having a raised portion, the material is covered by a lower foil, defining a lower surface comprising a concave portion, preferably substantially tapered, and preferably by an upper foil, defining an upper surface substantially parallel to the lower surface, each intermediate element is configured such that its concave portion has a substantially tapered shape, each intermediate element is configured such that its concave portion is substantially in the shape of a sphere portion, the shell has a generally cylindrical shape, and each intermediate element has a general shape of revolution around a central axis, the shell having an inner diameter larger than the diameter of the intermediate element before the step of compression, the shell has a generally cylindrical shape, the method including, after the step of compression, a step for closing the shell using covers at each end of the shell, for example by crimping or by stapling, a sealing ring preferably being arranged between the shell and each cover, at least one cover has a shape complementary with the shape of a surface of an end intermediate element with which it is in contact, the material has, after compacting, a density comprised between 1.25 and 1.4 $Kg/dm^3$ wherein the absorbent salts are metallo-chlorous salts, for example salts of strontium chloride ($SrCl_2$), and the method includes a step for producing a central axial orifice in each intermediate element, said central orifice being designed to allow the passage of the heating resistance within the cartridge during the use thereof.

The invention also relates to an ammonia storage cartridge, in particular for a motor vehicle gas exhaust system, including a plurality of intermediate elements stacked in a shell, wherein each intermediate element has a lower surface and an upper surface that are parallel to each other, each having a raised portion.

These and other features may be best understood from the following drawings and specification.

BRIEF DESCRIPTION OF THE DRAWINGS

The invention will be better understood upon reading the following description, provided solely as an example and done in reference to the appended drawings, in which.

DETAILED DESCRIPTION

Figure 1:
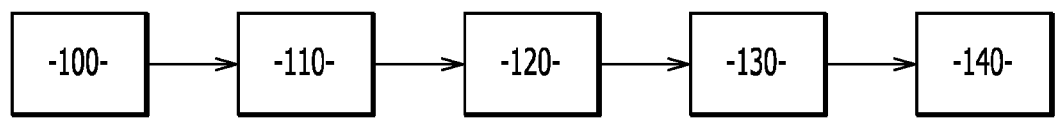
FIG. 1 shows the steps of a manufacturing method according to one embodiment of the invention.
Figure 7:
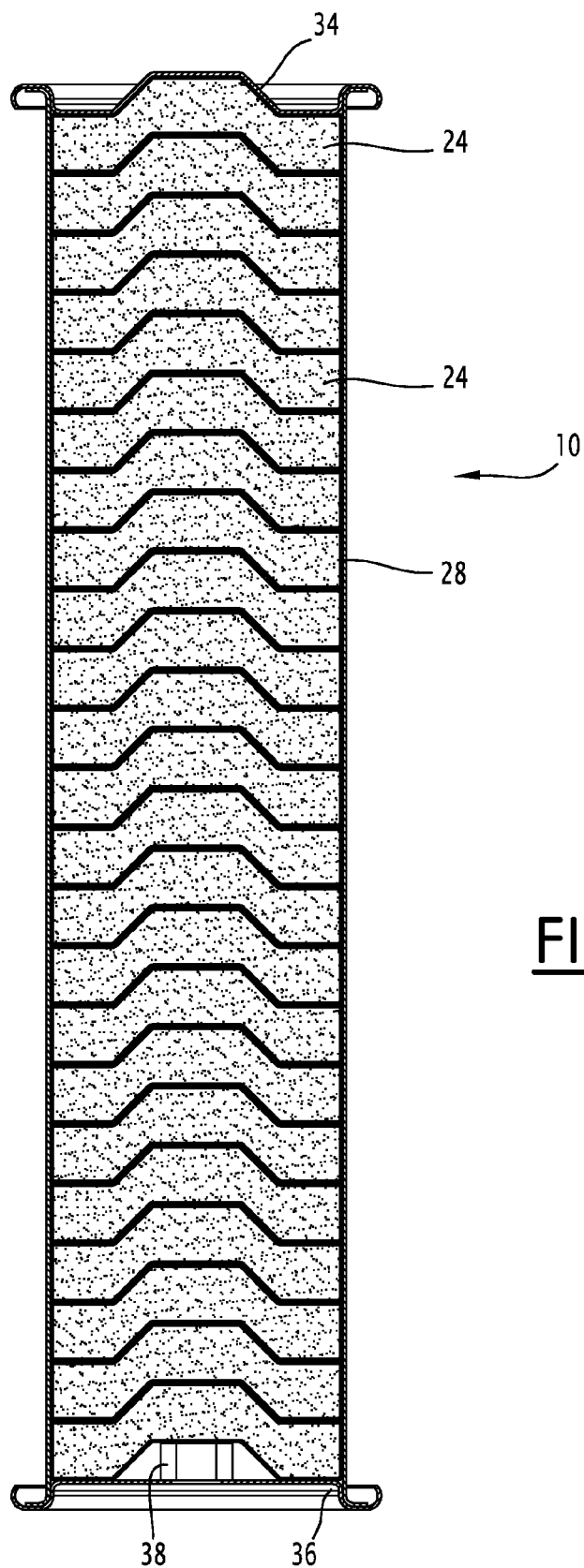
FIG. 7 is an axial cross-sectional view of an ammonia storage cartridge made using the method according to the invention.

FIG. 1 shows the steps of the method for manufacturing an ammonia storage cartridge, in particular for a motor vehicle exhaust system. The storage cartridge, shown in FIG. 7, is designated by general reference 10.

The method includes a first step 100 for supplying a material capable of absorbing or adsorbing, and desorbing, ammonia, for example including absorbent salts, such as metallo-chlorous salts, in particular salts of strontium chloride ($SrCl_2$). To that end, the salts of strontium chloride are dried, then cooled, before being mixed with ammonia, the ammonia being absorbed until saturation. The material thus obtained is designated by the chemical formula $Sr(NH_3)_8Cl_2$.

Alternatively, the material may be obtained by absorption or adsorption of the ammonia using any suitable type of absorbent salt. In general, the chemical formula for the material is written $M_a(NH_3)_nX_z$, where M represents at least one cation chosen from among an alkali metal, such as Lithium (Li), Sodium (Na), Potassium (K) or Cesium (Cs), an alkaline Earth metal such as Magnesium (Mg), Calcium (Ca) or Strontium (Sr), Aluminum (Al) and a transition metal such as Vanadium (V), Chrome (Cr), Manganese (Mn), Iron (Fe), Cobalt (Co), Nickel (Ni), Copper (Cu), or Zinc (Zn), or any possible combination of said elements, such as NaAl, KAl, $K_2Zn$, CsCu or $K_2Fe$, X represents at least one anion chosen from among fluoride, chloride, bromine, iodide, nitrate, thiocyanate, sulfate, molybdate, and phosphate, a is the number of cations per salt molecule, z is the number of anions per salt molecule, and n is a coordination number comprised between 2 and 12.

Figure 2:
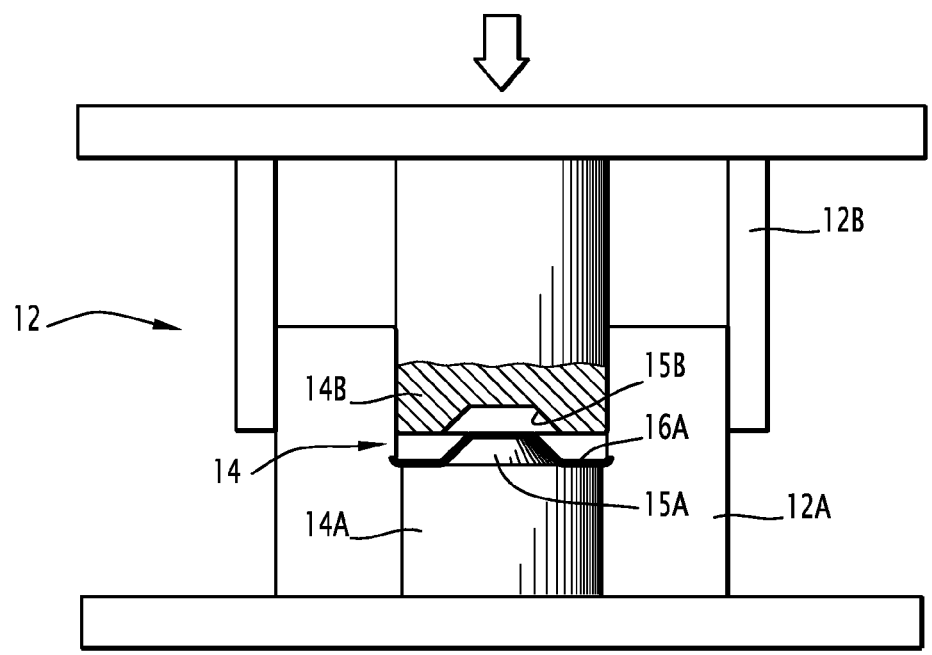
FIG. 2 diagrammatically shows a press during the step for covering with a material capable of absorbing or adsorbing ammonia, at least partially saturated with ammonia.

The method then includes a step 110 for making an intermediate element, during which the material obtained at the end of the supply step 100 is covered with at least one thermally conductive foil, so as to form the intermediate element. Each covering step is described in reference to FIGS. 2 to 4.

This step 110 is carried out using a first press 12 including a stationary part 12A and a moving part 12B. The first press 12 includes a mold 14 having a lower part 14A, supported by the stationary part 12A of the first press 12, and an upper part 14B supported by the moving part 12B of the first press 12.

The mold 14 has a general shape of revolution around an axis. The lower part 14A has a substantially tapered male area 15A, and the upper part 14B has a female area 15B complementary to the male area 15A.

Figure 5:
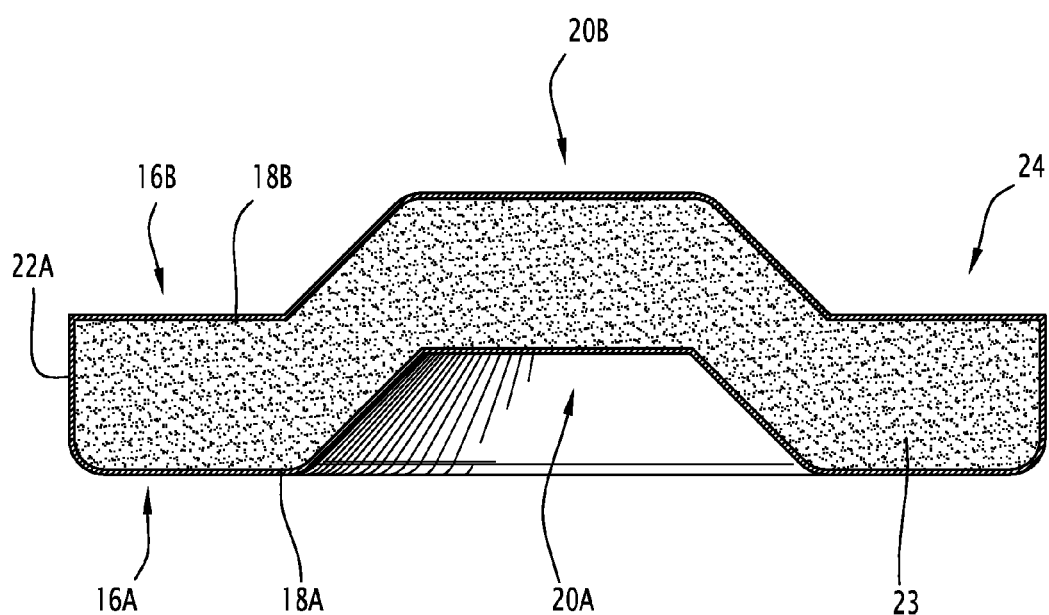
FIG. 5 is an axial cross-sectional view of an intermediate element made at the end of the covering step.

Thus, the first press 12 in particular makes it possible to configure thermally insulating foils, preferably made from aluminum, by providing a flat foil that is pressed in the mold 14. One thus obtains a lower sheet 16A, in particular defining a lower surface 18A comprising a substantially tapered female portion 20A, as shown in FIG. 5. This lower foil 16A also defines a circular lateral surface 22A.

Alternatively, the lower surface may have a different raised portion from that previously described.

Figure 3:
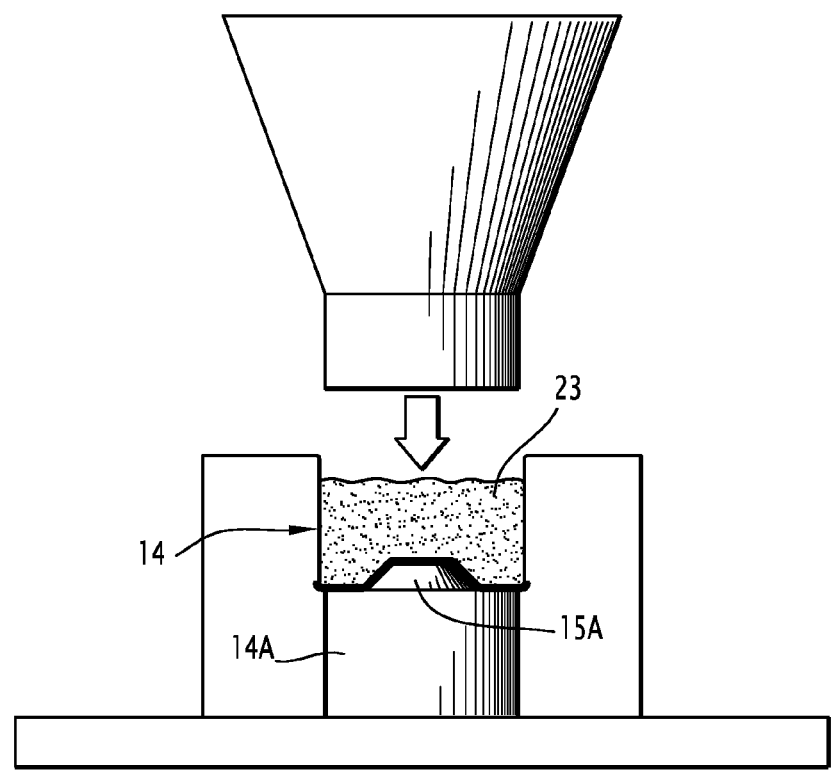
FIG. 3 diagrammatically shows a press during the step for covering with a material capable of absorbing or adsorbing ammonia, at least partially saturated with ammonia.
Figure 4:
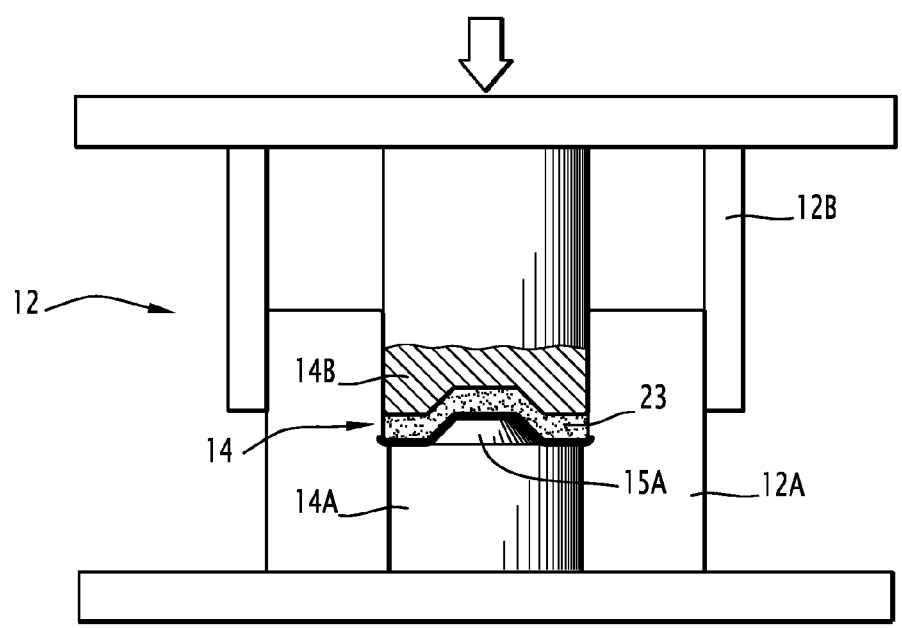
FIG. 4 diagrammatically shows a press during the step for covering with a material capable of absorbing or adsorbing ammonia, at least partially saturated with ammonia.

As shown in FIG. 3, the mold 14 is then filled with the material 23. This material 23 is then compacted at a first pressure, for example comprised between 1 and 2 $t/cm^2$, as shown in FIG. 4, until a density is obtained comprised between 1.25 and 1.4 $Kg/decimeter^3$.

During this compacting, the height of the material 23 for example goes from 65 mm to 20 mm.

The step 110 advantageously ends with the addition of an upper foil 16B, defining an upper surface 18B that is substantially parallel to the lower surface 18A. In particular, the upper surface 18B includes a substantially tapered male portion 20B with a shape complementary to that of the tapered female portion 20A.

Alternatively, the intermediate element 24 may not include an upper foil.

FIG. 5 shows an intermediate element 24 thus obtained at the end of step 110.

Figure 8:
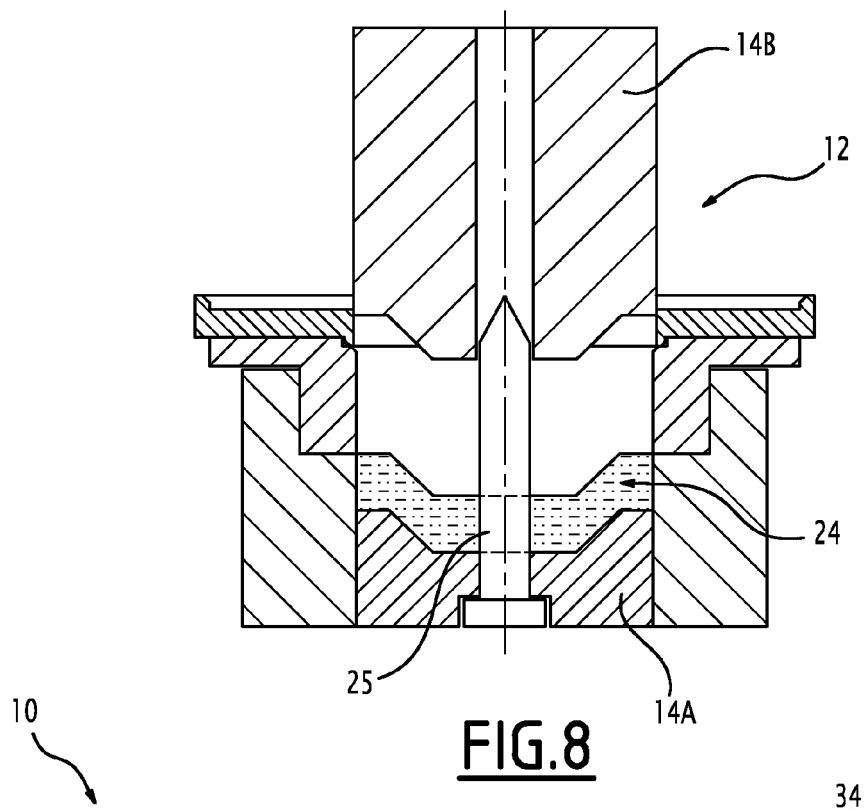
FIG. 8 is an axial cross-sectional view of the compacting of the material to produce at least one intermediate element including a central orifice.

Advantageously, each intermediate element 24 could alternatively include a central axial orifice, allowing the passage of a heating resistance within the cartridge 10 during use thereof. FIG. 8 shows a press 12 for producing such an intermediate element 24.

This press 12 is similar to that previously described, but also includes a central rod 25 extending longitudinally in the mold 14. To that end, the lower 14A and upper 14B parts of the mold include longitudinal orifices for passage of the central rod 25.

The material is thus compacted around the central rod 25, such that the intermediate element 24 resulting from that compacting has a central orifice complementary to the rod 25.

Figure 6:
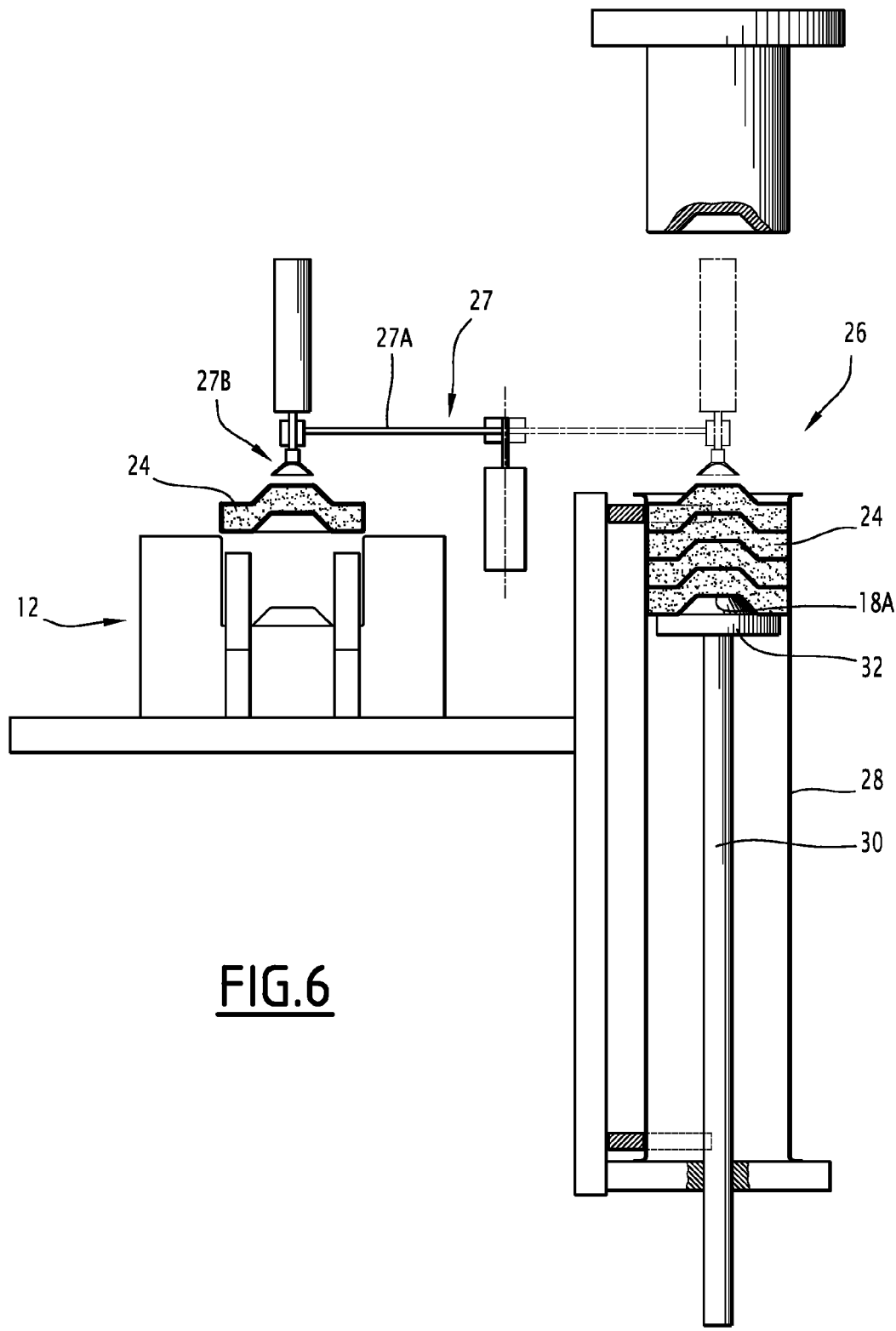
FIG. 6 shows machines performing a compression step of the intermediate elements.

As shown in FIG. 6, the intermediate element 24 obtained is then removed from the first press 12 to be stacked in a second press 26 with other intermediate elements 24, during a step 120 for stacking the intermediate elements 24. To that end, a removal device 27 is provided, including an arm 27A movable between the first 12 and second 26 presses, the arm 27A being provided with a mechanism 27B for gripping the intermediate element 24.

The arm 27A deposits the intermediate elements 24 in a cartridge shell 28 to produce a stack of the intermediate elements 24 in the shell 28. The shell 28 is generally cylindrical with an inner diameter larger than the diameter of the intermediate elements 24.

The second press 26 includes a support rod 30, designed to receive the stack of intermediate elements 24. The support rod 30 includes a head 32 with a shape complementary to that of the lower surface 18A of each intermediate element 24, such that the stack is stably maintained on the head 32.

It will be noted that, due to the complementary male and female shapes of the lower 18A and upper 18B surfaces of the intermediate elements 24 adjacent in the stack, these intermediate elements 24 are centered relative to one another along an axis, and stacked stably on one another.

During a step 130, the stacked intermediate elements are subjected to the application of a second pressure in the shell 28 by the second press 26.

Preferably, the second pressure is lower than the first pressure.

According to a first example embodiment of a manufacturing method, this step 130 for applying a pressure is a compression step, not substantially altering the density of the material. In that case, the second pressure is preferably less than one tenth of the first pressure.

Alternatively, according to a second example embodiment of the manufacturing method, the step 130 for applying pressure 130 is a second compacting step, altering the density of the compacted material.

Due to their tapered shape, these intermediate elements 24 extend radially during their compression, until they come into contact with the inner wall of the shell 28. This compression does not significantly alter the density of the intermediate elements 24.

For example, the shell 28 has an inner diameter of 102 mm, and each intermediate element has a diameter of 101.5 mm before compression.

After this compression, the intermediate elements 24 are stacked without play between them, and without play with respect to the inner wall of the shell 28.

The stacking and compression may be done in a single operation or through several successive operations.

The intermediate elements 24 deform little during the compression, with the result that the risks of losing material 23 during the compression are limited.

It will be noted that, through this compression, the intermediate elements 24 are reversibly connected with the shell 28. Thus, after using the cartridge, when the ammonia has been extracted from the intermediate elements 24, it is possible to remove the intermediate elements 24 from the shell 28 to replace them, and thus to reuse the shell 28 to produce a new cartridge 10.

After the intermediate elements 24 have been stacked and compressed over the entire length of the shell 28, the method includes a step 140 for closing the shell using upper 34 and lower 36 covers.

Preferably, the upper cover 34 has a shape complementary to that of the upper surface 18B of the intermediate end element 24 with which it is in contact.

The lower cover 36 can also have a shape complementary to the shape of the lower surface 18A of the intermediate end element 24 with which it is in contact, or, as shown in FIG. 7, a planar shape.

Advantageously, the cartridge 10 includes a connector 38, designed to be connected to a hose (not shown) designed to collect the $NH_3$ gas extracted from the material during use of the cartridge. Preferably, and in particular in the case of a flat shape of the lower cover 36, this connector 38 also forms a crosspiece between the lower cover 36 and the lower surface 18A of the intermediate end element 24.

Preferably, the closing step is carried out by crimping, or by stapling the covers 34 and 36 at each end of the shell 28. Such a crimping or stapling step, unlike a welding step generally used in the state of the art, does not generate heat, and therefore does not cause the desorption of the stored ammonia.

Advantageously, a sealing ring is provided between the shell 28 and each of the covers 34 and 36.

It will be noted that the invention is not limited to the embodiment previously described, but may assume various alternatives without going beyond the scope of the claims.

In particular, the compression step 130 could alternatively be done by constricting the shell 28, i.e. by radial compression, so as to decrease its diameter until the intermediate elements 24 are radially compressed.

Furthermore, the intermediate elements 24 could assume another form, for example with a polygonal transverse section.

Figure 9:
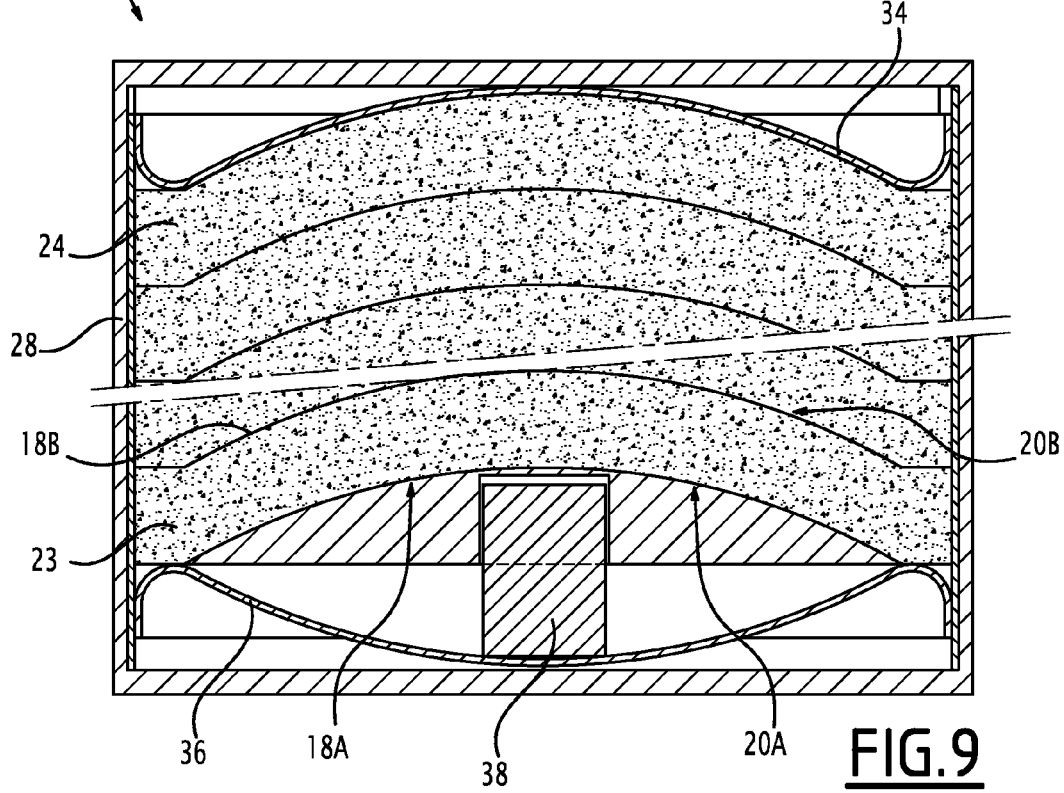
FIG. 9 is a partial axial cross-sectional view of an ammonia storage cartridge according to a second embodiment of the invention.

Another form of intermediate elements 24 is shown in FIG. 9, partially showing a cartridge 10 according to a second embodiment. In that figure, the elements similar to those of the preceding figures are designated using identical references.

According to this second embodiment, each intermediate element 24 is configured such that its concave portion 20A is substantially in the shape of a sphere.

Such a shape makes it possible to optimize the filling volume of the cartridge 10, and to better distribute the compacting pressure on the lower surfaces 18A and 18B of each intermediate element 24.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for manufacturing an ammonia storage cartridge, in particular for a motor vehicle exhaust system, including:
    providing a material capable of absorbing or adsorbing ammonia, at least partially saturated with ammonia,
    producing an intermediate element having a general shape of revolution around a central axis, including compacting the material to form the intermediate element, wherein the compacting of the material is done at a first pressure and alters a density of the material compacted,
    stacking at least two intermediate elements in a stacking direction such that the central axes of the at least two intermediate elements are aligned with each other and are parallel to the stacking direction, the at least two intermediate elements being stacked in a shell of the ammonia storage cartridge; and
    compressing, in the stacking direction, the stack of the at least two intermediate elements in the shell, wherein the compressing of the stack of the at least two intermediate elements is done at a second pressure that is lower than the first pressure, and wherein compression of the stack of at least two intermediate elements in the shell does not alter the density of the material.

2. The manufacturing method according to claim 1, wherein, during the producing of the intermediate element, the material is covered, preferably after compacting, with at least one thermally conductive foil.

3. The manufacturing method according to claim 1, wherein the producing of an intermediate element is carried out such that each intermediate element has a lower surface and an upper surface that are parallel to each other, each having a raised portion.

4. The manufacturing method according to claim 1, wherein the material is covered by a lower foil, defining a lower surface comprising a concave portion, and by an upper foil defining an upper surface substantially parallel to the lower surface.

5. The manufacturing method according to claim 4, wherein each intermediate element is configured such that the concave portion has a substantially tapered shape.

6. The manufacturing method according to claim 4, wherein each intermediate element is configured such that the concave portion thereof is substantially in the shape of a sphere portion.

7. The manufacturing method according to claim 1, wherein the shell has a generally cylindrical shape, the shell having an inner diameter larger than a diameter of the intermediate element before the compression.

8. The manufacturing method according to claim 1, wherein the shell has a generally cylindrical shape, the method including, after the compression, closing the shell using covers at each end of the shell, and arranging a sealing ring between the shell and each cover.

9. The manufacturing method according to claim 8, wherein at least one cover has a shape complementary with the shape of a surface of an end intermediate element with which the cover is in contact.

10. The manufacturing method according to claim 1, wherein the material has, after the compacting for forming the intermediate element, a density comprised between 1.25 and 1.4 Kg/dm$^3$.

11. The manufacturing method according to claim 1, wherein the material comprises absorbent salts that are metallo-chlorous salts.

12. The manufacturing method according to claim 1, including producing a central axial orifice in each intermediate element, the central orifice being designed to allow the passage of a heating resistance within the cartridge during the use thereof.

13. An ammonia storage cartridge, in particular for a motor vehicle exhaust system, including:
a plurality of intermediate elements stacked in a shell, wherein each intermediate element has a lower surface and an upper surface that are parallel to each other, each having a raised portion, and each having a general shape of a revolution around a central axis, the intermediate elements having their central axes aligned.

14. The ammonia storage cartridge according to claim 13, wherein the intermediate elements are stacked on top of each other such that a lower surface of one intermediate element abuts directly against an upper surface of an adjacent intermediate element.

15. The ammonia storage cartridge according to claim 13, wherein each intermediate element has an initial uncompacted configuration, and wherein material used to form each intermediate element is compacted at a first pressure to alter a density of the material compacted resulting in a subsequent compacted configuration,
wherein a stack of the intermediate elements in the shell has an initial uncompressed configuration and wherein the stack is then compressed within the shell to a subsequent compressed configuration at a second pressure that is lower than the first pressure, and wherein compression of the stack of intermediate elements in the shell does not alter the density of the material.

16. The method according to claim 1, wherein stacking the at least two intermediate elements includes directly abutting a lower surface of one intermediate element against an upper surface of the other intermediate element.

17. The method according to claim 1, including supporting a stack of intermediate elements on a support and applying the second pressure to compress the intermediate elements together.

18. The ammonia storage cartridge according to claim 13, wherein each intermediate element includes compacted material that is compacted at a first pressure to alter a density of the material compacted, and wherein a stack of the intermediate elements in the shell is compressed in a stacking direction at a second pressure that is lower than the first pressure to provide a compressed stack of intermediate elements, and wherein compression of the stack of intermediate elements in the shell does not alter the density of the material within each intermediate element.

* * * * *